United States Patent [19]

Desage

[11] Patent Number: 4,748,314
[45] Date of Patent: May 31, 1988

[54] DEVICE FOR THE RAPID VAPORIZATION OF A LIQUID

[75] Inventor: Robert Desage, Verneuil, France

[73] Assignee: A.R.M.I.N.E.S., Paris, France

[21] Appl. No.: 20,871

[22] Filed: Mar. 2, 1987

[30] Foreign Application Priority Data

Mar. 3, 1986 [FR] France ............................. 86 02934

[51] Int. Cl.$^4$ ............................................. H05B 3/60
[52] U.S. Cl. ................................. 219/274; 219/273; 219/271
[58] Field of Search ............................. 219/271–276, 219/295; 122/366

[56] References Cited

U.S. PATENT DOCUMENTS

| 2,429,112 | 10/1947 | Warren | 219/274 |
|---|---|---|---|
| 2,519,515 | 8/1950 | Turner | 219/274 |
| 2,547,865 | 4/1951 | Hanks | 219/274 |
| 2,899,532 | 8/1959 | Reick | 219/275 |
| 3,377,462 | 4/1968 | Pferschy | 219/213 |
| 3,672,568 | 6/1972 | Foote | 219/274 |
| 4,020,321 | 4/1977 | Oswald | 219/271 |
| 4,196,341 | 4/1980 | Williams | 219/295 |
| 4,266,116 | 5/1981 | Bauer | 219/274 |
| 4,382,173 | 5/1983 | Leicester | 219/295 |

FOREIGN PATENT DOCUMENTS

| 0011054 | 5/1980 | European Pat. Off. | |
|---|---|---|---|
| 1012354 | 4/1952 | France | 219/274 |
| 2211268 | 7/1974 | France | |
| 2270204 | 12/1975 | France | |
| 2341340 | 9/1977 | France | |
| 2465959 | 3/1981 | France | |
| 479956 | 4/1953 | Italy | 219/274 |

Primary Examiner—E. A. Goldberg
Assistant Examiner—Teressa J. Walberg
Attorney, Agent, or Firm—McAulay, Fields, Fisher, Goldstein & Nissen

[57] ABSTRACT

To provide for the rapid vaporization of a liquid, a porous body is impregnated with the liquid. Then the liquid contained in the porous body is heated, so as to cause a rapid vaporization of the liquid in the porous body which liquid continually migrates through the porous body under the effect of its pumping and suction capabilities. The whole of the mass of liquid to be vaporized is stored in the body in impregnated form, without the presence of a permanent liquid layer. The liquid is heated directly by passing an electric current through the porous body, the density of the porous body being chosen so as to provide a liquid retention capacity allowing a variation of the energy dissipated in time to be obtained in accordance with a predetermined law which is a function of the density chosen for the porous body. Thus interchangeable porous bodies can be used having different densities and allowing different curves of variation of the energy dissipated in time to be obtained, respectively. To provide for operation in any position the liquid is introduced and stored in a liquid mass to be vaporized solely in impregnated form directly inside the porous body, without formation of a permanent liquid layer in a housing for the porous body.

20 Claims, 5 Drawing Sheets

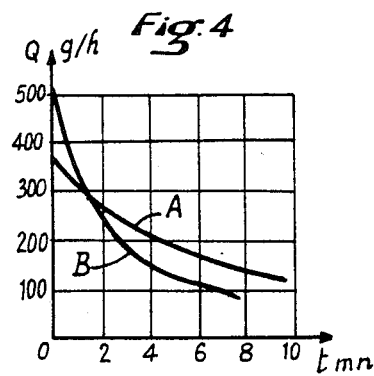
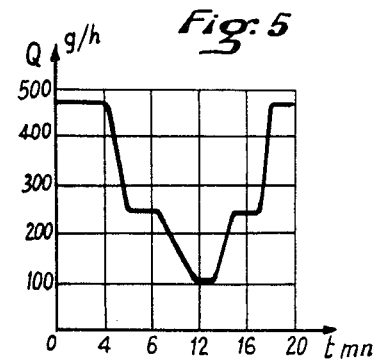
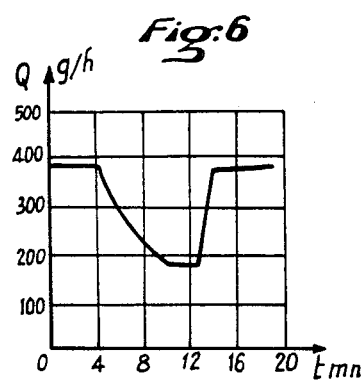
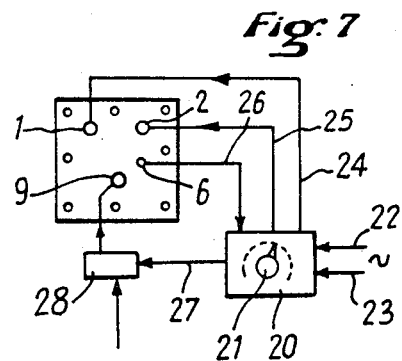
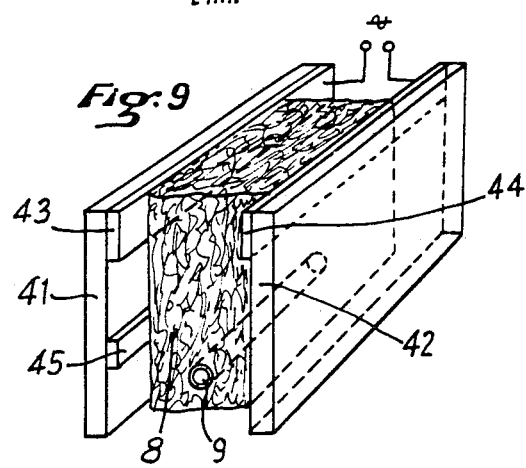
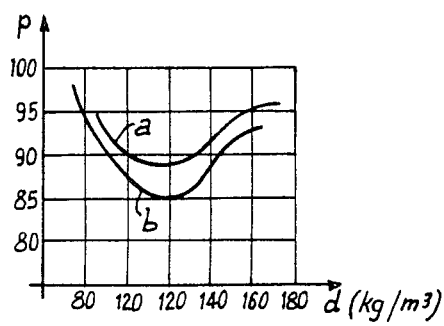
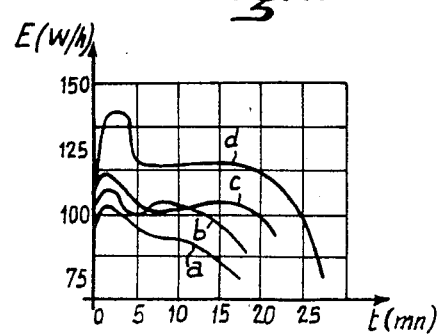

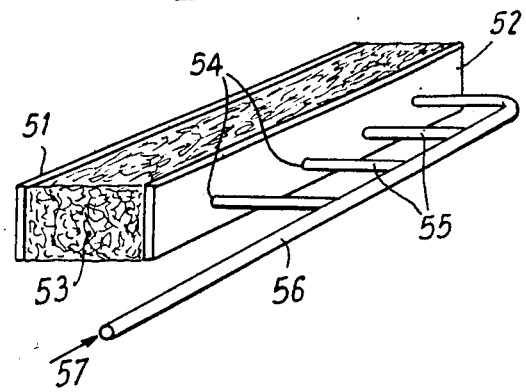
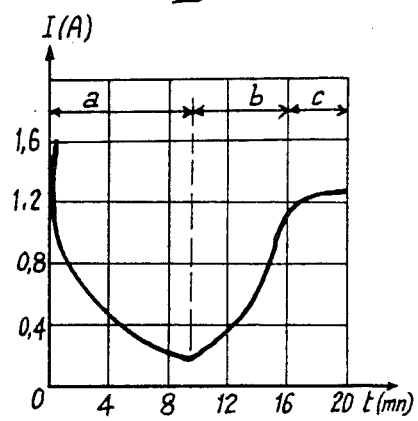
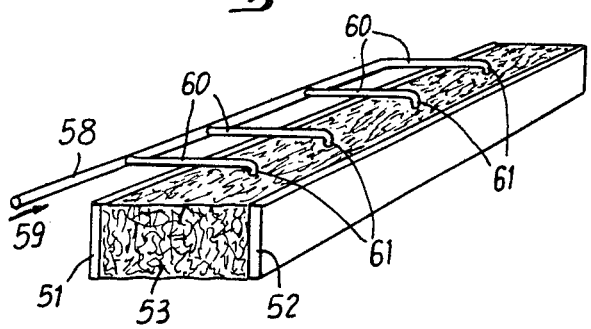
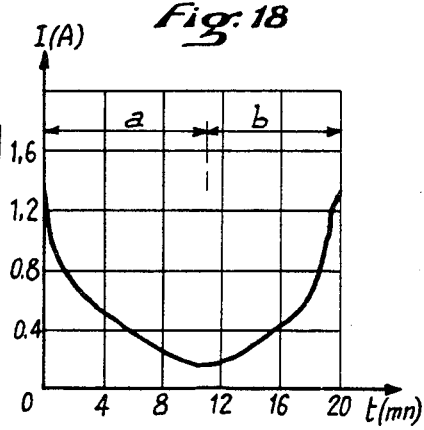
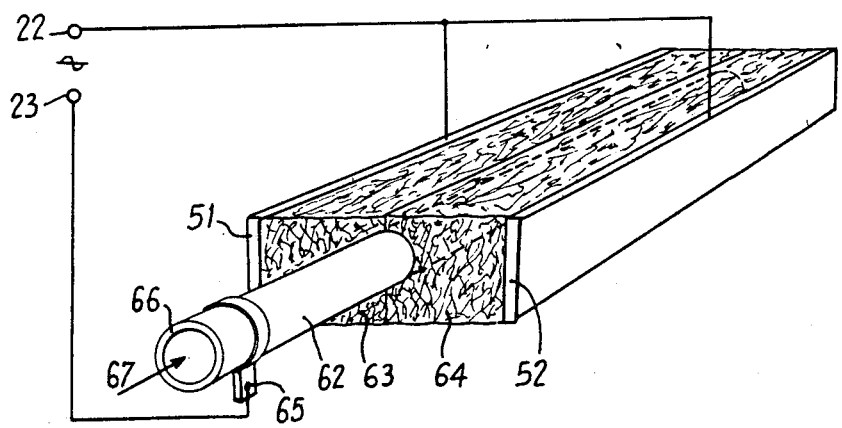

DEVICE FOR THE RAPID VAPORIZATION OF A LIQUID

BACKGROUND OF THE INVENTION

Most devices for the rapid vaporization of a liquid use one or more electric heaters plunged in a relatively large volume of water and therefore have a relatively long vaporizing phase and are relatively cumbersome. They use safety systems for the absence of liquid, they must necessarily be used in the horizontal position, they are relatively expensive not only in so far as their design is concerned but also their maintenance and they have mediocre efficiency, particularly when they are used at a low rate of activity and because of the heat losses due to the relatively large surfaces of the vapor generators.

Other types of device are further known for the rapid vaporization of a liquid including a porous body impregnated with liquid to be vaporized and electric heating means for heating the porous body and causing therein rapid vaporization of the liquid which migrates continually through the porous body under the effect of its pumping and suction capabilities, by capillarity, from a liquid layer situated at a lower level than that of the porous body and in which the porous body is partially plunged. Such devices are described for example in Patent Nos. FR-A-2 341 340 and FR-A-2 420 731.

These devices however, have the drawback of only being able to function in a horizontal position, because of the permanent presence of the liquid layer and of not allowing a desired variation profile in time to be obtained of the flow of vapor produced.

SUMMARY OF THE INVENTION

The present invention relates to improvements to this type of device for improving a number of its characteristics, the consequence of which is to be able to design products better adapted to the conditions of use or to new functions of use of the vapor produced.

To this end, this process of rapid vaporization of a liquid in which a porous body is impregnated with the liquid to be vaporized, the liquid contained in the porous body is heated so as to cause therein rapid vaporization of the liquid which continually migrates through the porous body under the effect of its pumping and suction capabilities, is characterized in that the whole of the mass of liquid to be vaporized is stored in the body in impregnated form, without the presence of a permanent liquid layer.

In the case where the liquid is heated directly by passing an electric current through the porous body, the density of the porous body is chosen so as to provide a liquid retention capacity allowing a variation of the energy dissipated in time to be obtained in accordance with a predetermined law which is a function of the density chosen for the porous body. Thus, in the same device, interchangeable porous bodies can be used having different densities and allowing different curves of variation of the energy dissipated in time to be obtained respectively.

The invention also relates to a device implementing the above method, this device being characterized in that it includes means for introducing and storing a mass of liquid to be vaporized solely in impregnated form directly within this porous body, without formation of a permanent liquid layer in the device.

In the case where the liquid is heated indirectly by passing an electric current through the porous body, this porous body has a density which is chosen so as to provide a desired law of variation of the energy dissipated in time.

The device of the invention may be charged with liquid to be vaporized over the whole of its surface or over a part thereof, either from the outside of the porous body (for example by filling, dipping, immersion, spraying etc . . . ) or from the inside of this body, by injection of liquid for example by means of a porous or perforated tube engaged in this porous body, or else by the pumping/suction effect of the porous body. Because the mass of liquid to be vaporized is stored wholly in impregnated form inside the porous body, without being able to escape despite the effect of gravity, it is possible to use the device in any position.

Through adjusting the amount of liquid stored in the porous body, the device of the invention may autonomously deliver vapor without constantly having to supply it with liquid, generally over a period of time from 1 to 30 minutes.

When the electric energy is used directly for heating the liquid by causing an electric current to flow through the porous body, between two electrodes in contact with this porous body, by varying the incoming liquid flow into the device, during replenishing thereof, it is possible with this device to impose a correlative variation of the flow rate of the vapor produced with a relatively short response time during this transfer. It also allows variation profiles of the vapor flow in time to be obtained in accordance with desired laws either with operating autonomy or by manual or servo-control.

In the case where the heat required for vaporizing the liquid is applied by the passage of an electric current through the porous body, this porous body may be charged, wholly or partially, with an electrically conducting salt, depending on the resistivity of the liquid vaporized.

The porous body of the device may be formed from one and the same homogeneous material, having the same characteristics over all its parts, or else from a material having different local characteristics, such as the density, depending on the requirements of the desired application or the nature of the liquid to be vaporized. This porous body may in particular be formed from materials of mineral, vegetable or animal origin, for example, from preshaped clay agglomerates baked in the oven or else from ceramics whose porosities are adequate. It may also be formed by a fabric or rove formed from short or long fibers, tangled or not, for example glass or alumina fibers and it may be further formed by capillary blocks obtained by sintering glass balls or metal balls. It may also be formed by blocks obtained by expansion on the basis of synthetic products, metal or plastic materials worked by machining. The porous body may have a flexible, rigid or semirigid structure to which may be added non porous materials chanelling the liquid or vapor flow as well as electric currents for bringing the vaporization current, a heat source and means for controlling the device.

Similarly, when the electric heating energy is delivered directly to the liquid to be vaporized, in the form of an electric current passing between two electrodes through the liquid impregnated porous body, these electrodes may be located wholly or partially on the surface of the porous body and/or inside these latter, these electrodes being formed from any electrically conducting material. In the case where the electric heating of the liquid to be vaporized is provided indirectly, an independent heating electric source may be used which may be located wholly or partially inside the porous body or on its surface, in contact with this latter or at a distance therefrom.

In all the cases of electric heating of the porous body, this porous body may be equipped with at least one electrode forming a voltage or current sensor, in at least one position on the surface of the porous body or thereinside, the purpose of this electrode being to estimate the degree of impregnation of the porous body and to allow the amount of renewal liquid to be controlled by means of a manual or servo-control.

In a particular embodiment of the invention, a small part of the electric vaporization current may be taken which is transformed into a voltage and this voltage is compared with an adjustable reference voltage so as to impose a desired input rate of a liquid by means of a servo-valve with on-off operation or with an action proportional to the difference between these two voltages. Thus, constant or variable vapor flow rates may be obtained in a range of 10 to 100% of the nominal power of the device.

Flow rate variations of the vapor produced may also be obtained by using the localized vaporization of a liquid contained in the supply circuit for the porous body, thus limiting the incoming liquid flow rate, for example by equipping a pumping wick bringing the liquid into the porous body with at least one electrode.

When direct heating is used by means of an electric current flowing through the porous body, a variation of the flow rate of the vapor produced may also be obtained by using the pumping capability of wicks feeding the porous body by adjusting the pumping height with respect to the intake position of the supply liquid.

The vapor generating device of the invention offers the advantage of a modest cost price, which allows it to be used more particularly in small apparatus or as periodic refill in prolonged use when it is saturated with lime from the heavily charged water. Furthermore, it may be constructed in compact form, it ensures high speed cycling up to the vapor phase and relatively short times for changing the vapor flow conditions because, more particularly, the passage of high flux densities may be prescribed in the liquid contained in the porous body forming a reservoir. Also, the fixation of the line contained in the vaporized water takes place and is distributed throughout the volume of the porous body, and not on a surface as in the case of a resistance plunged in the water, which thus increases the lifespan of the device while maintaining optimum yield.

The device of the invention may be applied to portable and mobile apparatus in all positions so as to be able to use the vapor produced rationally close to the place of use, for example for creating portable electric apparatus of manual type or mounted on robot arms of automatic production units or else in the case of decentralization of steam driven power stations.

The device of the invention may be fed with AC or DC current, at any voltage and it may be used for vaporizing any kind of liquid or solution. It may operate at a pressure lower than, equal to or greater than the atmospheric pressure and flux densities may be obtained in a range of 1W/cm$_2$ to a 100W/cm$_2$.

The device of the invention, for direct heating, equipped with an electrode and a control system, may for example allow a vapor flow range in a ratio of 1 to 3 to be obtained and passing from a minimum constant flow rate to a maximum constant flow rate and conversely in a lapse of time compatible with usual applications.

The method and device of the invention may be applied in very various fields, particularly in the industrial, household, small scale production and do it yourself fields.

BRIEF DESCRIPTION OF THE DRAWINGS

Different embodiments of the present invention will be described hereafter by way of non limitative examples with reference to the accompanying drawings in which:

FIGS. 4, 5, 6 are diagrams illustrating the operation of the device shown in FIGS. 1 to 3, FIG. 7 is a block diagram of a device for driving the high speed liquid vaporization device of the invention, FIG. 9 is a perspective view of a variant of construction of the high speed liquid vaporization device of the invention, FIGS. 10, 11 and 12 are diagrams illustrating the operation of the vaporization device shown in FIG. 9, FIG. 15 is a perspective view of another variant of construction of the device, FIG. 16 is a diagram illustrating the operation of the device of FIG. 15, FIG. 17 is a perspective view of another variant of construction of the device, FIG. 18 is a diagram illustrating the operation of the device shown in FIG. 17, FIG. 19 is a perspective view of another variant of construction of the device.

DESCRIPTION OF THE PREFERRED EMBODIMENTS

Figure 1:
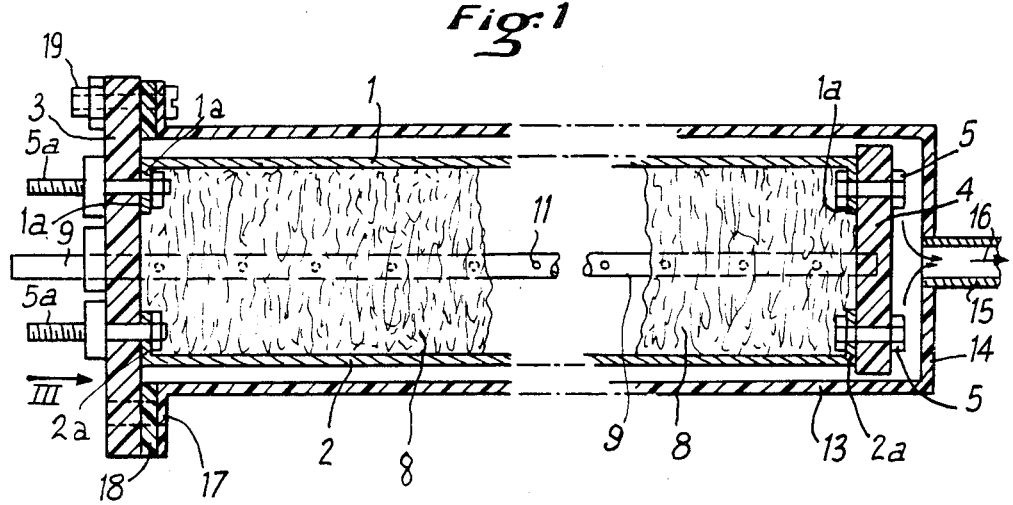
FIG. 1 is a longitudinal and horizontal sectional view, with parts cut away, of a high speed liquid vaporization device in accordance with the invention.
Figure 2:
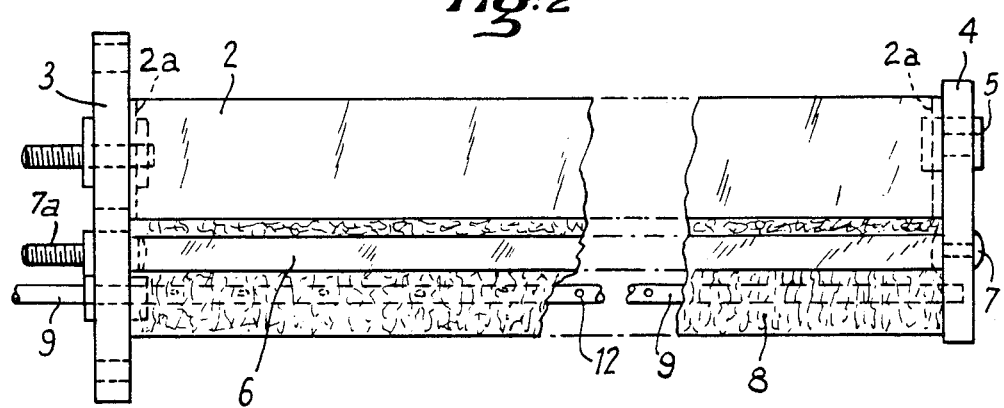
FIG. 2 is an elevational view of the internal part of the device shown in FIG. 1.
Figure 3:
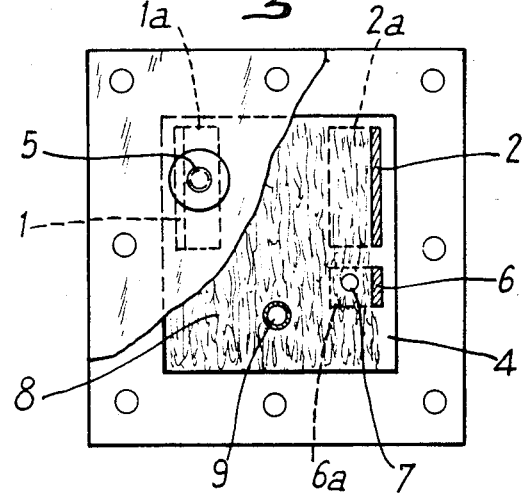
FIG. 3 is a profile view, taken from the left of FIGS. 1 and 2, and partially in vertical and cross section.

The high speed liquid vaporization device which is shown in FIGS. 1 to 3 includes two longitudinal and vertical plates 1, 2 forming current lead-in electrodes, parallel to each other and made from an electrically conducting material, for example copper. Each of these current lead-in electrodes 1, 2 has a rectangular shape and it ends, at both its ends, in respective flanges 1a, 2a bent at right angles, by means of which it is fixed to two transverse cheeks made from an insulating material, namely a left hand cheek 3 and a right hand cheek 4, by means of screws 5, 5a passing through the cheeks 3, 4 and the right angled flanges 1a, 2a. Each of the electrodes 1, 2 may for example have a width of 15 mm, a length of 200 mm and a thickness of 1.5 mm. The two screws 5a fixing the electrodes 1, 2 to the lefthand cheek 3 are extended outwardly so as to form electric current supply terminals.

Between the two cheeks 3 and 4 and below one of the current lead-in electrodes, in this case electrode 2, there extends a detection electrode 6 formed by a bar of electrically conducting material, for example copper, whose ends 6a are bent at right angles and are fixed to the cheeks 3 and 4 by means of screws 7, 7a. Screw 7a which fixes the detection electrode 6 to the left hand cheek 3 is extended outwardly so as to form an electric connection terminal.

The detection electrode 6 has the same length as the current lead-in electrodes 1 and 2, that is to say 200 mm, and it may have a width of 5 mm and a thickness of 1.5 mm.

Between electrodes 1, 2 and 6 and the two cheeks 3 and 4 is housed a porous body 8, of any appropriate type, of a general parallelepipedic shape for example. This central porous body 8 may be formed by a rock wall filling in which the diameters of the fibers forming it are mainly between 1.5 and 5 micrometers whereas the length of these fibers goes from 3 to 10 mm. These fibers have a binder for improving the rise of the water by capillarity. (For example formo-phenolic resin representing 2.4% of the voluminal mass).

The porous body 8 extends over the whole length of the device, namely 200 mm, between the two cheeks 3 and 4 and may have a height of 45 mm.

In the lower part of the device there extends a longitudinal tube 9 for the intake of water or any other liquid to be vaporized, which passes through the left hand cheek 3 and ends in the right hand cheek 4, its right hand end being enclosed in this cheek. The water supply tube 9, made for example from a material known under the name of "Teflon", is placed at a certain distance, for example 10 mm, above the low part of the porous body 8. Tube 9 is pierced, in its upper part, with holes 11, having substantially vertical axes, with for example a diameter of 0.5 mm and are spaced apart by a distance of 15 mm. It is also pierced horizontally, on both faces, with opposite through holes 12 having substantially horizontal axes. Tube 9 extends through a longitudinal hole formed at the appropriate position in the lower part of the porous body 8.

The high speed liquid vaporization device of the invention, which is shown in FIGS. 1 to 3, is completed by a parallelepipedic housing 13, surrounding the assembly formed by the electrodes 1, 2, 6, the cheeks 3, 4 and the porous body 8, at a certain distance therefrom. This housing 13 is closed at its right hand end by a front cheek 14 pierced centrally with a hole to which is connected a duct 15 for discharging the vapor produced which escapes as is shown by the arrow 16. At its left hand end, housing 13 has an external collar 17 which is fixed to the left hand cheek 3, with interpositioning of an insulating seal 18, by means of screws 19.

When the current lead-in electrodes 1 and 2 are supplied with electric current, by connecting the left hand terminal screws 5a to the two poles of an electric current source, for example the mains, the current which flows through the porous body 8, between the two electrodes 1, 2, causes heating and vaporization of the liquid impregnating the porous body. The vapor produced leaves the apparatus through the duct 15.

FIGS. 4, 5 and 6 show diagrams illustrating the operation of the device of the invention under different conditions.

The diagram of FIG. 4, corresponds to the case where the porous body 8 is previously saturated with water, by injection thereof through the perforated tube 9, and it is then not refilled. In this diagram, as well as in the diagrams of the other Figures, the time T is plotted along the x axis (in minutes) whereas the vapor flow rate Q (in g/h) is plotted on the y axis. The diagram of FIG. 4 shows two curves A and B corresponding respectively to two porous bodies having different densities, namely a density of 115 kg/m3 for curve A and 160 kg/m3 for curve B. It can be seen that the flow of vapor produced decreases in time, more rapidly in the case of curve A (porous body of low density) than in the case of curve B (porous body of high density).

The diagram of FIG. 5 illustrates a controlled variation of the vapor flow Q using the detection electrode 6. From the current picked up by this detection electrode 6 and which depends on the humidification condition of the hollow body, it is possible, using a servo-system, to adjust the electric current supplied to the current lead-in electrodes 1 and 2 so as to vary at will the vapor flow. The curve of the diagram of FIG. 5 corresponds to an initial constant vapor flow of 480 g/h being maintained, then to a decrease of this vapor flow to 250 g/h, then to maintaining this value at a constant level, then a drop to a plateau of 100 g/h, then to a rise of the vapor flow, in steps, up to 480 g/h.

The diagram of FIG. 6 illustrates another operating cycle for the device of the invention equipped with a porous body having a density of 115 kg/m3.

It may be noted, by comparing the diagrams of FIGS. 5 and 6, that, when the vapor flow Q is reduced, different slopes are obtained for obtaining the conditions established at each plateau, depending on the density of the porous body 8 used. On the other hand, when the vapor flow rates Q are increased, the slopes as a function of time are closely related.

Referring to FIG. 7, a diagram is shown of a device for driving the high speed liquid vaporization device of the invention. This control device includes an electronic circuit 20 having a potentiometer 21 for setting the required vapor flow rate, inputs 22, 23 for the electric supply from the mains, outputs 24, 25 connected respectively to the terminals of the heating electrodes 1, 2 of the vaporization device. A connection 26 is formed between the terminal of the detection electrode 6 and the electronic control circuit 20. Finally this circuit 20 is connected, through an electric connection 27 to an electromagnetic valve 28 connected between a water supply and the perforated tube 9 of the vaporization device. Thus it is possible, from the electric signal delivered by the detection electrode 6, to monitor the vapor flow rate and consequently to control, by means of the electronic control circuit 20, the water supply delivered to the vaporization device through the perforated tube 9.

In a variant, for driving the vaporization device a control voltage may be used taken from the terminals of a low resistance placed in series with the evaporator.

Figure 8:
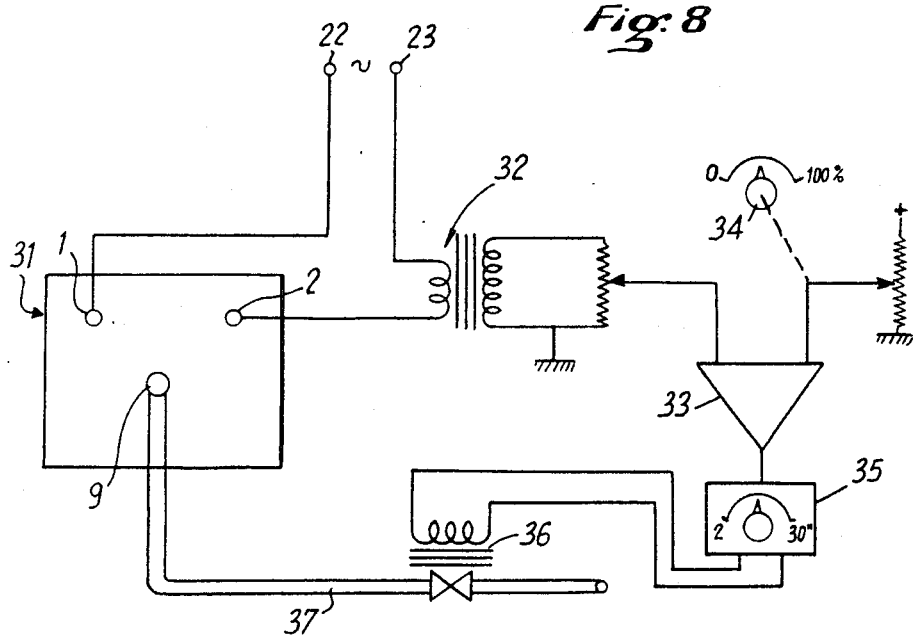
FIG. 8 is a block diagram of a variant of construction of a device for driving the high speed liquid vaporization device.

FIG. 8 is a diagram of a modulated regulation device driving an adjustable vapor generator between 0 and 100% of the nominal power of the device, by taking off a portion of the vaporization current which, by comparison with the reference, prescribes a regulated incoming liquid flow rate which is either all or nothing, or all or little, or else proportional. In this example, the vaporization device 31 of the invention has its two electrodes 1, 2 connected respectively to the two poles 22, 23 of the mains, electrode 2 being so connected through the primary winding of a voltage boosting transformer 32. The voltage appearing at the secondary of the transformer 32 is applied to one input of a two input comparator 3 receiving at its other input a reference voltage adjustable between 0 and 100% by means of a knob 34. The output signal of comparator 33, which corresponds to the difference between the voltage at the secondary of transformer 32 and the reference voltage set, is applied to a modulation or scrutinizing circuit 35, adjustable between 2 and 30 seconds and which delivers at its output a signal for energizing an electromagnetic valve 36 connected to a duct 37 connected to tube 9 for supplying the porous body with liquid. Thus, when the water penetrates into the vaporization zone of the device, between the two electrodes 1 and 2, and when the intensity of the electric current flowing between the electrodes is less than the desired value, the voltage difference obtained causes opening of the electromagnetic valve 36, which increases the water flow towards the porous body and the vaporization zone whence an increase of the intensity of the current between electrodes 1 and 2. As soon as this electric current reaches and exceeds the fixed threshold, the electromagnetic valve 36 is again closed. To this system for maintaining a vapor flow there may be added means for programming an operating cycle for controlling the vapor flow variations in accordance with a preestablished pattern. Simply, the voltage difference between the reference voltage and the voltage from transformer 32 may be used for controlling a proportionally operating water intake valve for prescribing a required flow rate or a pressure.

In the variation of construction of the invention shown in FIG. 9, the high speed liquid vaporization device of the invention is in the form of a self contained apparatus, which is portable and which may be charged with a certain amount of water. In this case, the porous body mass 8, of parallelepipedic shape, is held in position between two vertical and longitudinal cheeks 41 and 42 made from an insulating material. Each of these cheeks has, at the upper part of its internal face, a respective current lead-in electrode 43, 44 formed by a horizontal bar made from an electrically conducting material held in contact with the upper part of the central porous body 8. The current lead-in electrodes 43, 44 each have preferably a thickness of 1 mm, a length of 80 mm and a height of 10 mm. The two cheeks 41, 42 are held parallel to each other, at a distance of 30 mm and the porous body 8 has, for example, a height of 60 mm, a width of 50 mm and a thickness of 30 mm, this porous body being slightly compressed between the current lead-in electrodes 43, 44.

Figure 12:
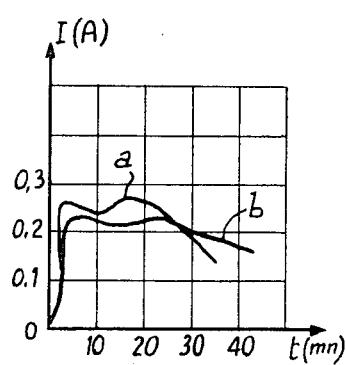

The diagrams of FIGS. 10, 11 and 12 illustrate the advantages and the possibilities offered by the device of FIG. 9.

The diagram of FIG. 10 illustrates the variation of the percentage p of water contained at saturation in the porous body, plotted as ordinates, as a function of the density d of the porous body, in kg/m3, plotted as abscissa. The curves a and b illustrate the cases of two porous bodies 8 formed from fibers of different origins.

The diagram of FIG. 11 illustrates the variation of the energy dissipated E, expressed as W/h, as a function of the time t, expressed in minutes, when water contained at saturation in the porous body 8 is vaporized by the passage of an AC electric current by applying a voltage of 220 volts between the two electrodes 43 and 44, taking the resistivity of water as 1500 ohms/cm, and when said amount of water is exhausted during a whole period. Four curves of variation of the energy dissipated a, b, c, d are plotted in the diagram of FIG. 11, these curves corresponding respectively to porous bodies having densities of 70 kg/m3, 100 kg/m3, 120 kg/m3 and 140 kg/m3. It can for example be seen that for a density of 140 kg/m3, the energy dissipated is practically constant for 20 minutes whereas for the density of 70 kg/m3 the energy dissipated decreases without stopping for 20 minutes. This type of device may be equipped with an additional detection electrode 45, similar to the detection electrode 6. This detection electrode 45 is fixed to the internal face of one of the cheeks 41 and it extends longitudinally below the current lead-in electrode 43, carried by cheek 41. The detection electrode 45 allows the resistance of the liquid in the porous body 8 to be known at a given time by measuring the electric current flowing through it coming from the opposite electrode 44. Thus the device may be replenished with liquid as soon as it reaches a preestablished dehydration threshold. The injection of replenishing liquid may take place directly into the porous body 8, by means of the perforated tube 9 extending longitudinally in the lower part of the porous body 8, or else by filling or steeping in a liquid mass.

The device shown in FIG. 9 forms an evaporator in which an amount of water is stored for obtaining an independence of operation between two refills, and which may be used in all positions, while offering a great rapidity in obtaining vapor. This device may be readily replenished with water, when the need is felt, by introducing this water, from any source whatsoever (for example a tap), through an appropriate refill orifice provided in the external case.

Furthermore, the device shown in FIG. 9 lends itself particularly well to changing of the internal porous body, so as to be able to use a porous body having a density chosen so as to obtain a variation of the energy dissipated in time in accordance with a desired law, such for example as one of the curves a, b, c, d of FIG. 11.

The diagram of FIG. 12 shows the results obtained with a porous body 8 of felt type formed of short fibers of a diameter of about 2 $\mu$, comprising 50% of polyester fibers and 50% of polypropylene fibers. These porous bodies 8 were used in a device such as shown in FIG. 9 with copper electrodes 43 and 44 having a width of 1 cm. The porous body 8 has a height of 40 mm, a length of 50 mm and a thickness between the electrodes of 40 mm. The curve of using up the stored water is 12 W/cm2 in the case of curve a and 10 W/cm2 in the case of curve b.

Figure 13:
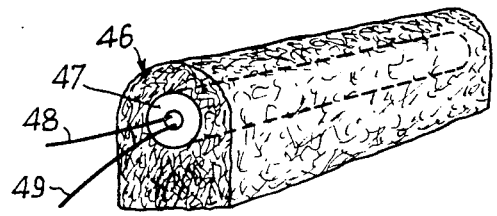
FIG. 13 is a perspective view of another variant of construction of the high speed liquid vaporization device of the invention.

In the variant of the invention, shown in FIG. 13, the device includes an elongate porous body 46, formed as a single block or as two coupled parts, whose surface has a cross section in the form of an inverted U and in the upper part of which there extends longitudinally an electric heating resistance 47 connected by conductors 48 and 49 to an appropriate electric current source. This porous body 46 may be supplied with water by any of the described means, more particularly by projection, internal injection through a tube, steeping, pumping by means of a wick etc... The vapor flow rate may more-over be varied by varying correspondingly the heating power supplied, by chopping the current for example.

Figure 14:
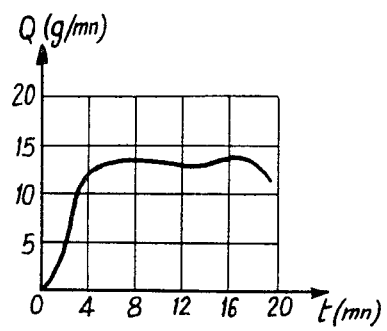
FIG. 14 is a diagram illustrating the operation of the vaporization device shown in FIG. 13.

FIG. 14 is a diagram illustrating the variation of the flow rate Q of the vapor produced, as a function of time t in minutes, using the device shown in FIG. 13, whose porous body 46 is made from alumina fibers.

In the variant of the invention shown in FIG. 15, the water to be vaporized is injected directly into the vaporization device through ducts passing through one off the two electrodes. The device shown in FIG. 15 includes two vertical and parallel copper plates 51, 52 facing each other, forming the electrodes, each having a length of 100 mm, a height of 20 mm, and a thickness of 1 mm for example. Between these electrodes 51 and 52 is compressed a parallelepipedic porous body 53 having a height of 20 mm. This porous body is formed of short rock fiber having substantially a length of 5 to 10 mm and a diameter of 2 to $5\mu$, these fibers being tangled in a stratification held in position by a binder promoting the capillary rise. This binder is a formo-phenolic resin representing 2.4% of the voluminal mass. This porous body has originally, in the form of a filling, a density of 80 kg/m3 with a tolerance of $\pm 10\%$, which, after compression between the electrodes 51, 52, is equivalent to 200 kg/m3. Electrode 52 is formed with four holes 54, of a diameter of 4.5 mm for example, aligned along the longitudinal axis of the electrode 52, with a pitch of gap between them of 20 mm. In the holes 54 penetrate four tubes 55, of an inner diameter of 2 mm and an outer diameter of 4 mm, so as to be housed over a depth of 3 mm in the porous body 53. These four tubes 55 are connected to a water manifold 56 which receives the supply water as is shown by the arrow 57. The incoming water flow may be controlled by a modulated selregulation device delivering a required vapor flow, through the action of an electromagnetic valve connected to the manifold 56, this self-regulation device being described for example with reference to FIG. 8.

The diagram of FIG. 16 corresponds to the case where the porous body 53 is previously saturated with water by injection of water coming from the manifold 56 and where a reduction of the vaporization current, so of the vapor flow, is simulated during a first period a so as then to observe an increase of the vaporization current, during a second period b, by reinjecting water into the vaporization zone, so as to arrive finally at a constant water flow rate, during a third period c. This test was carried out with an AC voltage of 220 volts, using a needle valve for simulating these different phases. This implementation may be simulated by controlling the device of FIG. 7. In this diagram as well as in the diagrams of the other Figures, the time t is plotted as abscissa, in minutes, whereas the current I in amps is plotted as ordinates. In this measurement, it can be observed that the vaporization current, so the vapor flow rate, becomes an eighth of the value at time 0, after a period of 9 minutes, and rises to six times this minimum value in six minutes, and becomes a constant flow rate for the four remaining minutes.

In the variant of the invention shown in FIG. 17, the liquid to be vaporized is injected through a drop by drop device spreading the liquid over the upper surface of the porous body 53. This kind of device is of the same design as the vaporization element shown in FIG. 1 not only in so far as the porous body is concerned but also in so far as the electrodes are concerned which have no pore. The drop by drop device includes a longitudinal water intake manifold tube 58 which is fed with water in the direction of arrow 59. To this longitudinal manifold tube 58 are welded four transverse tubes 60 which extend above the porous body 53. The open end 61 of each tube 60 is fitted with a device having a grooved ball for the passage of the water which falls onto the upper surface of the porous body 53. In this kind of ball device the pressure of the water distribution network is adjusted so as to vary the flow rate of the supply water and correspondingly the vapor flow rate. Similarly, instead of using a drop by drop device, a longitudinal porous tube may be fixed over the whole length of the porous body 53.

The diagram of FIG. 18 corresponds to the case where the porous body 53 is previously saturated with water as in the case of the device of FIG. 1 and of the results illustrated in the diagram of FIG. 16. A progressive decrease of the intensity of the electric current, so of the vapor flow, can be observed in this case which reaches a tenth of the flow rate of the vapor at the initial instant, after 9 minutes during the first period a, and rises gradually to the 18th minute, then rapidly until the 20th minute of the second period b, during which time the pressure is varied a second time at 18 minutes.

In the variant of the invention shown in FIG. 19, the water to be vaporized is injected through a wall of an electrically conducting porous and tubular electrode. The device shown in FIG. 19 includes the longitudinal parallel copper electrodes 51 and 52 as in the devices of FIGS. 15 and 17. Half way between these electrodes 51 and 52 there extends longitudinally a porous electrode 62, for example made from graphite, having an outer diameter of 12 mm and an inner diameter of 8 mm, and the wall of which has a porosity of 10 $\mu$ allowing the water to diffuse through this wall for supplying the porous bodies 63, 64 situated on each side of the tubular electrode 62. The porosity of this electrode corresponds to a desired flow rate range and it may be greater or smaller depending on the desired application. Of course, electrode 62 may have any cross section, circular, rectangular, etc . . . and it may be formed of any electrically conducting sintered material, for example, copper or stainless steel. The device is fed with an AC voltage of 220 volts through a pole 23 of the mains which is connected to a metal collar 65 intimately fixed to the tubular electrode 62, whereas the other pole 22 of the mains is connected to the two electrodes 51 and 52 which are connected in parallel. Several porous electrodes such as electrode 62 and non porous electrodes may be associated together or disposed side by side so as to form a compact vaporization element. In the water supply connection circuit account must be taken of the lead-in section of the liquid, of the length of the pipe and of the resistivity of the liquid elements so as to obtain the lowest possible apparent resistance with respect to the electric supply voltages, while providing a water supply tube made from an insulating material which is connected to the end 66 of electrode 62, so that the water penetrates into this electrode in the direction of arrow 67.

With the device shown in FIG. 19, the same vapor flow rate profiles may be obtained as the one illustrated in FIG. 16, either by adjusting the flow rate by means of a valve, or by controlling the servo-control system.

Figure 20:
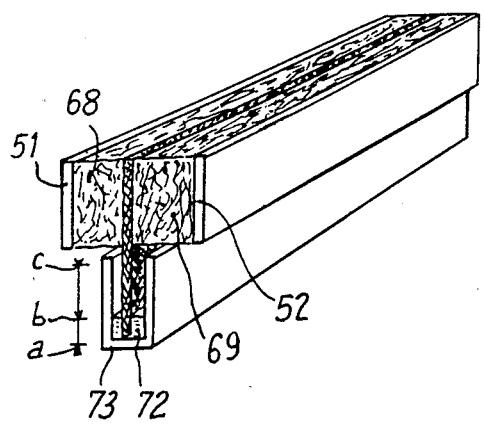
FIG. 20 is a perspective view of another variant of construction of the device.
Figure 21:
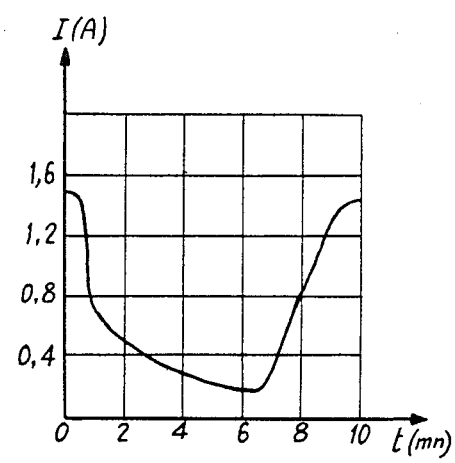
FIG. 21 is a diagram illustrating the operation of the apparatus shown in FIG. 20.

In the variation of the invention shown in FIG. 20, the water to be vaporized is brought into the vaporization zone through a wick pumping water from a duct in which the level of the water may cause the vapor flow rate to vary, and even interrupt this flow when the water intake is interrupted, during a programmed operating cycle for example. For comparing the results, the same porous body is used as in the example of FIG. 1, as well as the same electrodes 51, 52 disposed at the same distance. Between the two electrodes 51 and 52 extend two porous parallelepipedic bodies 68, 69 which are disposed longitudinally side by side with, therebetween, a wick 71 extending longitudinally and vertically. This wick 71, whose upper part is thus firmly applied against the two porous bodies 68, 69 dips, at its lower part, into a liquid mass 72 contained in a duct 73 of U shaped cross section. In this duct 73 the height of the liquid may be varied between the levels a, b and c, through a control electrode actuating for example an electromagnetic valve. The pumping capacity of wick 71 is chosen as a function of the desired vapor flow range. In this embodiment, a cotton wick 71 was used having a thickness of 2 mm and whose height dipping in the water between levels a and b is 30 mm. By varying the level over this distance, the vapor flow rate is varied from single to double between the low part and the high part. For the same conditions of measurement of the devices, the results obtained were also compared which appear in the diagram of FIG. 21 where the same trends of variation of the vapor flow or of the intensity of the vaporizing electric current can be observed.

Figure 22:
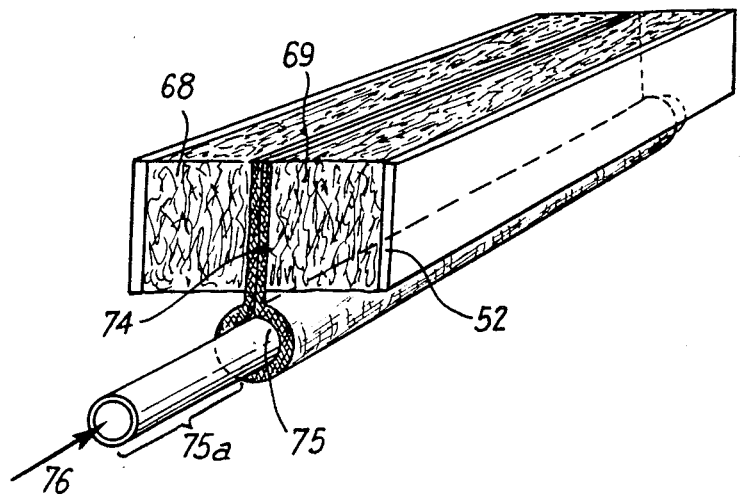
FIG. 22 is a perspective view of yet another variant of construction of the device.

In the embodiment of the invention shown in FIG. 22, the water to be vaporized is brought into a porous tube surrounded by a wick which, after being imbibed at the low part, brings the liquid by capillarity into the vaporization zone. In this device, electrodes 51 and 52 are used of the same nature and dimensions, the same porous bodies 68, 69 having the same characteristics and between which is inserted the double thickness of a cotton wick 72. This wick 74 surrounds, by its low part, a porous tube 75, for example made from ceramics, having an inner diameter of 4 mm and an outer diameter of 6 mm and whose porosity with respect to wick 72 is 10 μ. This porous tube 75 extends longitudinally under the porous body 68, 69 and is fed with water in the direction of arrow 76. The front endmost part 75a of tube 75 is sealed by any appropriate means. In this variant of design of the evaporator device vaporization current variations are obtained closely related to the preceding example for the same measuring conditions.

Although, in all the embodiments of the invention which have been described above, the liquid to be vaporized is heated directly by passing an electric current through the porous body, between two electrodes, or indirectly by means of an electric heating resistance housed in the porous body, heat sources of other types may be used also, which are currently available, for example radiation, conduction, HF electric field, gas or liquid combustion sources etc.

What is claimed is:

1. A device for the high speed liquid vaporization of a liquid including in a closed housing, a porous body impregnated with liquid to be vaporized which is placed wholly or partially between and in contact with two longitudinal current lead-in plate electrodes made from an electrically conducting material and which may be connected respectively to the two poles of an electric current source, and said lead-in electrodes acting as heating electrodes for heating the liquid contained in the porous body and causing therein high speed liquid vaporization of the liquid which continually migrates through the porous body under the effect of its pumping and suction capacity, means for introducing and storing a liquid mass to be vaporized solely in impregnated form directly in this porous body, without formation of a permanent liquid layer in the housing, density of the porous body being chosen according to a rate of decrease of the vapor flow rate depending on the density of the porous body.

2. The device as claimed in claim 1, including an electric heating member extending inside said porous body.

3. The device as claimed in claim 1, including a perforated or porous tube engaged in said porous body, said tube being connected to a liquid source for introducing and storing a liquid mass to be vaporized directly within this porous body.

4. The device as claimed in claim 1, further comprising tubes extending transversely above said porous body, connected as a whole to a water liquid intake manifold and each having, at its open end, a device for drop by drop passage of water falling onto an upper surface of the porous body.

5. The device as claimed in claim 1, wherein said porous body is made in two porous parts applied one against another, and between the two porous parts disposed side by side a wick extends downwardly whose lower part dips into a liquid mass contained in an upwardly opened duct and in which height of the liquid mass may vary between different levels.

6. The device as claimed in claim 1, wherein said porous body is made in two parts disposed side by side and between these parts extends a double thickness of a wick surrounding, by its low part, a porous tube connected to a liquid source and extending longitudinally under the porous body.

7. The device as claimed in claim 1, wherein the density of the porous body is chosen so as to give a desired rate of variation of energy dissipated in time.

8. The device as claimed in claim 7, further including one of the electrodes being pierced with holes aligned along a longitudinal axis of this electrode and in which are engaged respective transverse tubes connected to a liquid supply manifold, each tube penetrating over a certain length inside the porous body.

9. The device as claimed in claim 7, further including a porous tubular electrode, made from an electrically conducting material, extending longitudinally inside the porous body, this tubular electrode being connected to a liquid supply tube and being connected electrically, by means of a collar, to a pole of a power supply mains whose other pole is connected to the two electrodes in parallel.

10. The device as claimed in claim 7, wherein the current lead-in electrodes and a detection electrode are formed by bars whose respective ends, bent at right angles, are fixed by means of screws to two transverse cheeks made from an insulating material, the screws fixing the current lead-in electrodes and said detection electrode to one of the cheeks being extended outwardly so as to form electric connection terminals.

11. The device as claimed in claim 7, including a detection electrode, said current lead-in electrodes being carried by upper parts of internal faces of two longitudinal cheeks made from an insulating material, holding a porous body in position therebetween and, said detection electrode is fixed to the internal face of one of the cheeks, below the current lead-in electrode carried by this cheek.

12. The device as claimed in claim 7, further comprising current measuring means for measuring electric current passing through the porous body and means for regulating incoming liquid flow as a function of this measurement.

13. The device as claimed in claim 12, wherein the current measuring means includes a detection electrode extending longitudinally below one of the heating electrodes and through which passes a current flowing through the porous body between said detection electrode and said other heating electrode.

14. The device as claimed in claim 12, wherein said current measurement means include a resistance in series with the current lead-in electrodes, at terminals of which resistance a control voltage is taken.

15. The device as claimed in claim 12, wherein the means for regulating the incoming liquid flow rate include an electronic circuit having a potentiometer for setting a required vapor flow rate, inputs for an electric power supply from a mains, outputs connected respectively to terminals of the current lead-in electrodes, a connection between a terminal of a detection electrode and an electronic circuit and an electromagnetic valve connected to a liquid supply duct, this electromagnetic valve being coupled to the electronic control circuit by an electric connection.

16. The device as claimed in claim 12, wherein a primary winding of a transformer is connected in series in an electric power supply circuit of the two electrodes, t secondary winding of this transformer is connected to an input of a two input comparator receiving an adjustable reference voltage at its other input and an output of the comparator at which an error voltage appears is connected to a modulation circuit, of adjustable period, whose output is connected to an electromagnetic valve connected in a liquid supply duct.

17. A device for the high speed liquid vaporization of a liquid free of the formation of a permanent liquid layer, including:
a closed housing;
a porous body impregrated with a liquid to be vaporized, said porous body having a density related to a rate of decrease of vapor flow rate depending on the density of said porous body;
a pair of spaced current lead-in plate electrodes made from an electrically conducting material for connection with respectively to two poles of an electric current source;
said porous body being at least partially placed between and in contact with said pair of spaced current lead-in plates for heating the liquid contained within said porous body and causing in said porous body high speed liquid vaporization of the liquid which continually migrates through said porous body under effect of its pumping and suction capacity, and means for introducing and storing a liquid mass to be vaporized solely in impregrated form directly in said porous body, without formation of a permanent liquid layer in said housing, 18. The device of claim 17, including;
a pair of spaced insulating checks substantially orthogonal to said pair of spaced current lead-in electrodes;
an electrical connector for each said lead-in plate electrodes passing through one of said cheeks; and
a longitudinal tube having at least one hole, said tube extending through said porous body with said porous body surrounding said hole and in contact with an area of said tube surrounding said at least one hole, and said longitudinal tube extending through one of said cheeks at one end thereof and being supported at its other end thereof by said other cheek.

19. The device of claim 18, including a detection electrode between and connected with said cheeks and substantially parallel with said lead-in electrodes; said detection electrode and said lead-in electrodes all having the same length, with said detection electrode having a width substantially less than the width of said lead-in electrodes.

20. The device of claim 19, wherein said housing includes a duct for discharging the produced vapor.

* * * * *